United States Patent [19]

Ho

[11] Patent Number: 4,957,050
[45] Date of Patent: Sep. 18, 1990

[54] COMBUSTION PROCESS HAVING IMPROVED TEMPERATURE DISTRIBUTION

[75] Inventor: Min-Da Ho, Somers, N.Y.

[73] Assignee: Union Carbide Corporation, Danbury, Conn.

[21] Appl. No.: 402,556

[22] Filed: Sep. 5, 1989

[51] Int. Cl.$^5$ .............................................. F23G 7/04
[52] U.S. Cl. .................................. 110/346; 110/348; 110/238; 431/9
[58] Field of Search ............... 431/190, 115, 116, 4, 431/8, 9; 110/238, 235, 346, 348

[56] References Cited

U.S. PATENT DOCUMENTS

| | | | |
|---|---|---|---|
| 250,602 | 12/1881 | Thiollier et al. | 110/297 |
| 289,400 | 12/1883 | Fahrig | 110/297 |
| 4,186,669 | 2/1980 | Cowan et al. | 110/347 |
| 4,199,024 | 4/1980 | Rose et al. | 431/190 |
| 4,257,763 | 3/1981 | Reed | 431/190 |
| 4,411,618 | 10/1983 | Donaldson et al. | 431/190 |
| 4,462,318 | 7/1984 | Carbeau et al. | 110/238 |
| 4,475,883 | 10/1984 | Schirmer et al. | 431/190 |
| 4,476,791 | 10/1984 | Cegielski, Jr. | 110/346 |
| 4,496,306 | 1/1985 | Okigami et al. | 431/8 |
| 4,577,567 | 3/1986 | Moore et al. | 110/347 |
| 4,598,650 | 7/1986 | Schneckenberger | 110/246 |
| 4,618,323 | 10/1986 | Mansour | 431/190 |
| 4,630,555 | 12/1986 | Guillaume et al. | 110/346 |
| 4,693,680 | 9/1987 | Snyder et al. | 431/190 |
| 4,863,371 | 9/1989 | Ho | 431/9 |

FOREIGN PATENT DOCUMENTS

| | | | |
|---|---|---|---|
| 2222906 | 10/1974 | France | 431/190 |
| 74930 | 6/1977 | Japan | 431/190 |
| 164209 | 10/1982 | Japan | 431/190 |

OTHER PUBLICATIONS

Technology Demonstration Summary, Superfund Innovative Technology Evaluation, U.S. EPA, May, 1989.

*Primary Examiner*—Edward G. Favors
*Assistant Examiner*—Denise L. Ferensic
*Attorney, Agent, or Firm*—Stanley Ktorides

[57] ABSTRACT

A method for carrying out combustion in a combustion zone using oxygen or oxygen-enriched air as the oxidant wherein atomized liquid is provided to the combustion zone separate from oxidant and combustible vapors, causing it to be distributed throughout the combustion zone and then, especially after its vaporization, uniformly provided to the combustion reaction with consequent uniform temperature moderation, and resulting in reduced NO$_x$ generation and reduced refractory damage.

20 Claims, 1 Drawing Sheet

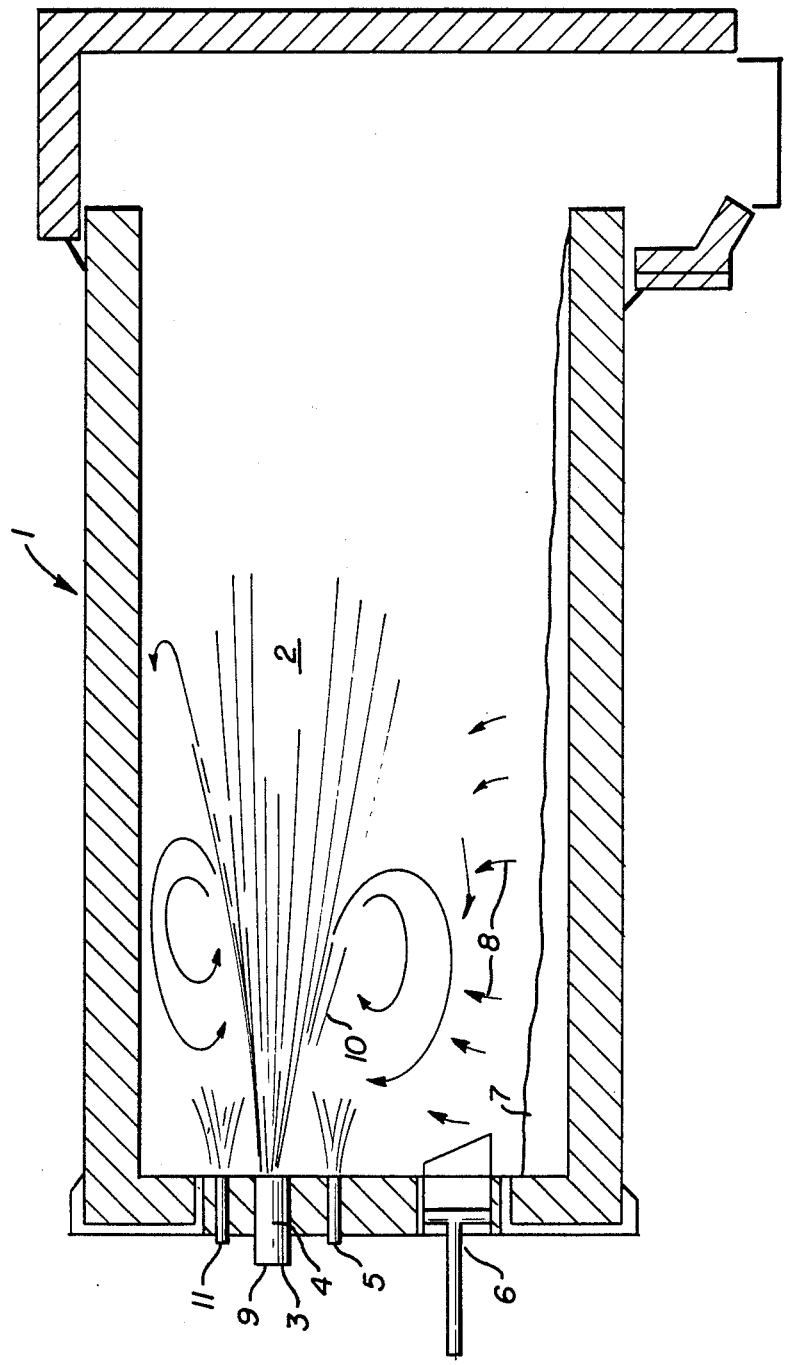

COMBUSTION PROCESS HAVING IMPROVED TEMPERATURE DISTRIBUTION

TECHNICAL FIELD

This invention relates generally to combustion and is particularly advantageous for use in incineration with oxygen-enriched air or pure oxygen.

BACKGROUND ART

It is desirable to carry out combustion, such as in incineration, with as high a throughput as possible so as to enhance the economics of the incineration process while achieving high combustion efficiency. A known method for increasing efficiency is to employ pure oxygen or oxygen-enriched air as the oxidant. The throughput of an incineration system is often limited by the volumetric flow rate of the flue gas. Since incineration with pure oxygen or oxygen-enriched air generates significantly lower volumes of flue gas for any given amount of combustion, such use increases the incinerator throughput and thus the overall efficiency of the incineration process.

A problem however with the use of pure oxygen or oxygen-enriched air in a combustion process is the high temperatures at which such combustion is carried out. This problem is especially evident in an incineration process wherein the waste to be incinerated has a high heating value such as one exceeding 3000 BTU/lb. The high temperatures may cause damage to the refractory, and may cause the excessive generation of harmful pollutants such as nitrogen oxides, commonly referred to as $NO_x$.

It is known to use indirect heat sinks such as a water jacket wall to control the temperature within a combustion zone. However, such indirect heat sinks are generally mechanically complex. In addition, the cooled wall creates layers of cold gases which tend to deteriorate the organic chemical destruction efficiency of an incineration process. Furthermore, waste to be incinerated normally contains chlorine and/or sulfur compounds which form combustion products which can be very corrosive to the heat transfer surfaces.

Another known method for controlling the temperature within a combustion zone is to provide gas ballast, such as air, to the combustion zone. Unfortunately this method increases the flue gas volume and thus decreases the throughput thus negating some of the advantages of the oxygen or oxygen-enriched air combustion.

It has been proposed to use water as a heat sink within an incinerator combustion zone for temperature modification when the temperature reaches a predetermined high temperature setpoint. This is desirable because water vapor contains approximately twice the enthalpy per unit volume as does nitrogen at incineration temperatures and thus the throughput of the incinerator would undergo much less of a negative impact. However, the sudden injection of water may cause a temporary loss of vacuum. Unfortunately heretofore the use of water as an incinerator heat sink has failed to avoid the increase in the level of $NO_x$ generation and the poor temperature uniformity associated with a high oxygen environment, thus reducing the desirability of its use. In addition water spray may cause damage due to uneven cooling of refractory, and may also cause quenching of the combustion reaction.

Accordingly, it is an object of this invention to provide a combustion process which can employ pure oxygen or oxygen-enriched air as the oxidant and which employs a liquid heat sink while avoiding certain disadvantages presently associated therewith.

SUMMARY OF THE INVENTION

The above and other objects which will become apparent to one skilled in the art upon a reading of this disclosure are attained by:

A combustion process comprising:

(A) providing combustible vapor to a combustion zone;

(B) providing oxidant, having an oxygen concentration of at least 25 percent, into the combustion zone separately from the provision of said combustible vapor;

(C) providing atomized liquid into the combustion zone separately from said oxidant and said combustible vapor to provide coolant to the combustion zone;

(D) mixing coolant with said combustible vapor and/or oxidant; and (E) combusting the resulting combustible vapor with the resulting oxidant.

As used herein the term "recirculation ratio" means the ratio of the mass flowrate of material recirculated back toward the periphery of a jet to the mass flowrate of the total fluid input to the combustion zone.

As used herein the term "burner" means a device through which both oxidant and combustible matter are provided into a combustion zone.

As used herein the term "coolant" means atomized liquid or vapor formed by the evaporation of atomized liquid.

As used herein the term "lance" means a device through which only one of oxidant, combustible matter, and coolant are provided into a combustion zone.

BRIEF DESCRIPTION OF THE DRAWING

The sole Figure is a schematic representation of one embodiment of the invention wherein the combustion is a part of an incineration process carried out with a rotary kiln.

DETAILED DESCRIPTION

The present invention comprises the discovery that mere temperature moderation by use of a liquid heat sink within a combustion zone is insufficient to enable efficient combustion. The invention comprises the discovery that temperature uniformity rather than mere temperature moderation or reduction is the element which enables reduced $NO_x$ generation and which simultaneously avoids damage due to hot and cold spots, while operating with pure oxygen or oxygen-enriched air as the oxidant in a combustion reaction especially within an incinerator. The invention comprises the steps necessary to achieve the requisite temperature uniformity while simultaneously achieving temperature moderation. This simultaneous temperature reduction and temperature uniformity enables the attainment of the beneficial results.

In the practice of this invention combustible vapor is provided to a combustion zone. The combustible vapor may be provided to the combustion zone in any manner. Generally within an incinerator the combustible vapor is provided to the combustion zone by evaporation or volatization from liquid and/or solid matter within the incinerator. The combustible vapor may also be gaseous fuel, or volatized from liquid, provided to the combustion zone through, for example, a burner or a lance.

In the Figure there is illustrated one preferred embodiment of the invention wherein the combustion is carried out as part of an incineration process. Referring now to the Figure, there is illustrated rotary kiln 1 within which there is combustion zone 2. Fuel such as natural gas, propane, or fuel oil, and/or liquid waste, 3 may be injected into combustion zone 2 through burner 4. Fuel or liquid waste may also be injected into incineration zone 2 through lance 5. Liquid waste and/or solid waste such as is defined the Resource Conservation Recovery Act (RCRA) or the Toxic Substances Control Act (TSCA) may be provided into combustion zone 2 through ram feeder 6. This waste forms a bed 7 from which combustible vapors, such as 8, evaporate into combustion zone 2.

Oxidant is also provided into combustion zone 2 separately from the provision of combustible vapors. The oxidant may be technically pure oxygen having an oxygen concentration greater than 99.5 percent, or it may be oxygen-enriched air having an oxygen concentration of at least 25 percent and preferably greater than 30 percent. The oxidant may be provided into the combustion zone in any effective manner. In the embodiment illustrated in the Figure, oxidant 9 is provided into combustion zone 2 through post-mixed burner 4 and mixes in zone 2 with fuel and/or liquid waste 3. In addition to, or instead of, oxidant provision through a burner, the oxidant may be provided into the combustion zone through a lance. If a burner is employed in the operation of this invention, a preferred burner is the aspirator burner described and claimed in U.S. Pat. Nos. 4,378,205-Anderson and 4,541,796-Anderson.

Additional oxidant, such as air, may also be provided into the combustion zone. For example air may be provided into the combustion zone through inleakage or through air injection.

The defined oxidant and combustible vapor are provided separately into the combustion zone to enable mixing with coolant prior to combustion, as will be described more fully later. However the defined oxidant may mix with other fuel, such as fuel provided through a burner, and the defined combustible vapor may mix with other oxidant, such as air, prior to the interaction of the defined oxidant with the defined combustible vapor.

The oxidant is injected into the combustion zone at a high velocity sufficient to establish a stream 10 and a recirculation ratio within the combustion zone preferably greater than 4, and most preferably greater than 10. Generally the oxidant will be injected into the combustion zone at a velocity within the range of from 100 to 1000 feet per second.

In the practice of this invention, atomized liquid 11 is provided into the combustion zone and serves to absorb heat released from the combustion of the combustible vapor with the oxidant. The liquid is preferably comprised of at least 50 percent water, and, most preferably, is entirely water. The liquid may also be liquid waste, without a net heating value, intended for incineration within the combustion zone.

The liquid is provided into the combustion zone separately and spaced from the provision of the oxidant and combustible vapor, and preferably in a direction to avoid impingement of coolant onto refractory walls and to maintain the recirculation ratio greater than about 4. In a particularly preferred embodiment, the liquid serves to actually increase the recirculation ratio over that which would occur without the liquid injection, by the injection of the liquid in a manner having a high enough momentum.

The liquid droplets absorb heat by evaporation and undergo a temperature rise in the vapor phase while the combustible vapors release heat by combusting with oxygen. A strong recirculation is essential to achieve temperature uniformity by breaking up stratification and pockets of gases. This recirculation allows the heat sinks and the heat sources to be well mixed during the combustion process and promotes convective heat transfer. As a result, combustion is well-dispersed and the heat of combustion is quickly absorbed by nearby heat sinks and thus the flame temperature remains low.

Preferably the liquid droplets mix with the recirculating matter prior to mixing with the oxidant and/or combustible vapor.

In the process of this invention, atomized liquid, or vapor resulting from the vaporization of the atomized liquid, mixes with the combustible vapor and/or with the oxidant prior to the mixing of the oxidant with the combustible vapor. Preferably the coolant first mixes with the recirculating matter and then mixes with the oxidant and/or the combustible vapor. In this way the coolant serves to spread out either or both of the oxidant and combustible vapor and is in place prior to their mixing and combusting. This serves to keep to combustion temperature from rising too high as opposed to heretofore known methods which inject water into a combustion zone after a temperature rise past a high setpoint. By injecting the atomized liquid into the combustion zone separately from either the oxidant or the combustible vapor, and preferably first mixing the coolant with the recirculatinq matter, the coolant becomes more evenly dispersed throughout the subsequent combustion reaction thus enabling better temperature uniformity and the benefits attainable thereby. The wide dispersal of the liquid serves to maintain the temperature within the combustion zone lower, thus reducing refractory damage, by absorbing heat and generally becoming partially or totally vaporized. Thereafter the coolant mixes with the oxidant and/or the combustible vapor, preferably as part of the recirculation flow, prior to their combustion thus serving to maintain $NO_x$ formation low.

The perferable direction of the liquid may be achieved, for example, as follows. Many incinerators have a shape characterized by a longer or major axial dimension. The incinerator illustrated in the Figure is one such incinerator. In such an incinerator the stream formed by the oxidant is formed to pass through the incineration zone so as to preferably be within 20 degrees of parallel to this axial dimension. In the embodiment illustrated in the Figure, stream 10 is parallel to, i.e. at 0 degrees to, this axial dimension. In this situation it is preferred that the liquid be provided into the combustion zone at a direction within 30 degrees of parallel to this axial dimension. In the embodiment illustrated in the Figure, atomized liquid 11 is parallel to this axial dimension. In this way the liquid neither strikes the incinerator walls, nor substantially penetrates stream 10, but rather becomes entrained within the recirculating matter. This disperses the liquid droplets and causes more uniform heat transfer from the combustion reactions to the heat sink, generally evaporating the liquid, as the diluted coolant is carried by the recirculating matter and caused to interact with stream 10. This avoids the high degree of local hot and cold spots within the combustion zone which is believed to be a primary cause of high $NO_x$ generation heretofore observed with some incinerators.

The perferable momentum of the liquid may be achieved, for example, as follows. As is known, momentum is the product of the mass and velocity of a stream. If the waste to be incinerated is initially provided into the combustion zone in gaseous form or in easily volatilized liquid and/or solid form, it is desirable that the atomized liquid stream have a high degree of atomization or a relatively low momentum which can be achieved by providing a stream with a low velocity. In this way the atomized liquid is easily evaporated and recirculated close to the initial injection points where much of the combustion takes place.

Generally waste which is provided to an incinerator for incineration is characterized by high variability. Accordingly, in the preferred practice of this invention, the direction of the atomized liquid relative to the combustion stream and/or the degree of atomization of the atomized liquid is adjusted during the process to account for this variability.

Moreover, the oxygen demand of the waste to be incinerated may vary considerably during the incineration process, especially in the case where the waste is provided into the incinerator in an intermittent manner rather than continuously, and when the combustible vapors are non-uniformly generated from waste having a high heating value of 3000 or more BTU/lb. In such a situation it is desirable to adjust the oxidant flowrate to maintain a desired level of oxygen mole fraction within the combustion zone so as to avoid the generation of products of incomplete combustion. Any suitable means for adjusting the oxidant and liquid flowrates may be used; a preferred means is by a feedback control loop such as a proportional-integral-derivative feedback loop, commonly called a PID.

An additional benefit which is attained when water is used as all or part of the atomized liquid, is the chemical reaction of water with halogens within the waste to produce less harmful or readily removeable hydrogenated species and to produce oxygen for further combustion.

The following examples serve to further illustrate the invention. They are presented for illustrative purposes and are not intended to be limiting.

EXAMPLE 1

The combustion process of this invention was carried out by injecting diesel oil or fuel gas into a combustion zone of an incinerator along with oxidant having an oxygen content of greater than 60 percent, at a firing rate of 36,000 BTU/ft3 to achieve a recirculation ratio of about 20. The atomized liquid was water and was injected at a rate of 280 lb/million BTU in a direction parallel to the oxidant stream and with a high degree of atomization so that the low momentum of the atomized water caused early interaction with the oxidant and/or fuel. The combustion efficiency of the incineration exceeded 99.9 percent and the $NO_x$ generation was determined to be normally less than 0.02 lb/million BTU and as low as 0.02 lb/million BTU for optimized conditions.

EXAMPLE 2

The incineration process of this invention was carried out for the incineration of wet brominated sludge having a heating value which varied between 3000 and 4600 BTU/lb. Oxidant having a combined oxygen content of 40 percent was injected into an incinerator and formed a combustion stream with combustible vapors driven off the sludge. The combustion was carried out at a rate of 30,000 BTU/ft3 and with a recirculation ratio of about 5. Atomized liquid water was injected into the combustion zone at a rate which varied between 125 to 187 lb/million BTU in a direction with 5 degrees of parallel to the combustion stream so that it mixed with the oxidant and with the combustible vapor prior to their intermixture and combustion. The $NO_x$ generation was determined to be generally about 0.1 lb/million BTU while the incinerator throughput was increased by from about 60 to 80 percent, and transient emissions were significantly reduced, over that which was achieved by conventional incineration employing air as the oxidant.

Now by the use of the combustion temperature control process of this invention, one can carry out combustion using oxygen or oxygen-enriched air as the oxidant to increase throughput, employ atomized liquid to moderate high temperatures, achieve very low $NO_x$ generation, and avoid refractory wall damage. By injecting atomized liquid separately from either the oxidant and the combustible vapor, the liquid is caused to mix thoroughly throughout the combustion zone and, by absorbing heat and becoming vaporized, protect refractories and avoid localized hot spots. The resulting coolant, generally vaporized, is then mixed with the combustion reactants to moderate the combustion reaction temperature thus reducing $NO_x$ formation.

Although the process of this invention has been described in detail with reference to certain embodiments, those skilled in the art will recognize that there are other embodiments of the invention within the spirit and scope of the claims.

I claim:

1. A combustion process comprising:
   (A) providing combustible vapor to a combustion zone:
   (B) providing oxidant, having an oxygen concentration of at least 25 percent, into the combustion zone separately from the provision of said combustible vapor at a high velocity sufficient to establish recirculating matter within the combustion zone;
   (C) providing atomized liquid into the combustion zone separately from said oxidant and said combustible vapor to provide coolant to the combustion zone and mixing coolant with recirculating matter;
   (D) mixing resulting coolant with said combustible vapor and/or oxidant; and
   (E) combusting the resulting combustible vapor with the resulting oxidant.

2. The process of claim 1 wherein the combustion zone is within an incinerator.

3. The process of claim 1 wherein the combustible vapor is provided to the combustion zone by volatilization from solid and/or liquid waste.

4. The process of claim 3 wherein the waste has a heating value exceeding 3000 BTU/lb.

5. The process of claim 1 wherein the combustible vapor is provided to the combustion zone through a burner.

6. The process of claim 1 wherein the oxidant has an oxygen concentration greater than 30 percent.

7. The process of claim 1 wherein the oxidant is technically pure oxygen.

8. The process of claim 1 wherein the oxidant is provided into the combustion zone at a velocity sufficient to achieve a recirculation ratio greater than 4 wherein the recirculation ratio is the ratio of the mass flowrate of material recirculated back toward the periphery of a jet to the mass flowrate of the total fluid input to the combustion zone.

9. The process of claim 1 wherein the atomized liquid comprises at least 50 percent water.

10. The process of claim 1 wherein the atomized liquid is water.

11. The process of claim 1 wherein the atomized liquid does not substantially penetrate into the oxidant.

12. The process of claim 1 wherein the combustion zone has a major axial dimension and the oxidant passes through the combustion zone in a stream within 20 degrees of parallel to said axial dimension.

13. The process of claim 1 wherein the combustion zone has a major axial dimension and the atomized liquid is provided into the combustion zone a direction within 30 degrees of parallel to said axial dimension.

14. The process of claim 1 further comprising adjusting the injection direction of the atomized liquid.

15. The process of claim 1 further comprising adjusting the degree of atomization of the atomized liquid.

16. The process of claim 1 further comprising adjustinq the oxidant flowrate provided to the incineration zone.

17. The process of claim 1 wherein the oxidant and/or the atomized liquid flowrate are adjusted.

18. The process of claim 1 wherein the coolant contains some water and the combustion zone contains some halogen, further comprising the chemical reaction of water with halogen.

19. The process of claim 18 wherein the haloqen is provided to the combustion zone from solid and/or liquid waste.

20. The process of claim 1 wherein the combustible vapor is volatized from liquid provided to the combustion zone.

* * * * *

UNITED STATES PATENT AND TRADEMARK OFFICE
CERTIFICATE OF CORRECTION

PATENT NO. : 4,957,050

DATED : September 18, 1990

INVENTOR(S) : M. Ho

It is certified that error appears in the above-identified patent and that said Letters Patent is hereby corrected as shown below:

In column 4, line 28, delete "to" second occurrence and insert therefor --the--.

In column 4, line 35, delete "recirculatinq" and insert therefor --recirculating--.

In column 5, line 62, delete "0.02" and insert therefore --0.2--.

In column 6, line 8, delete "with" and insert therefor --within--.

In claim 13, line 3, between "zone" and "a" insert --at--.

In claim 19, line 1 delete "haloquen" and insert therefor --halogen--.

Signed and Sealed this

Twenty-fourth Day of December, 1991

Attest:

HARRY F. MANBECK, JR.

*Attesting Officer*      *Commissioner of Patents and Trademarks*